No. 771,238. PATENTED OCT. 4, 1904.
J. J. FRANK.
MULTIPHASE TRANSFORMER.
APPLICATION FILED FEB. 6, 1904.
NO MODEL.

Witnesses:
George H. Tilden.
Helen Oxford

Inventor:
John J. Frank,
by Albert H. Davis
Att'y.

No. 771,238. Patented October 4, 1904.

UNITED STATES PATENT OFFICE.

JOHN J. FRANK, OF SCHENECTADY, NEW YORK, ASSIGNOR TO GENERAL ELECTRIC COMPANY, A CORPORATION OF NEW YORK.

MULTIPHASE TRANSFORMER.

SPECIFICATION forming part of Letters Patent No. 771,238, dated October 4, 1904.

Application filed February 6, 1904. Serial No. 192,263. (No model.)

*To all whom it may concern:*

Be it known that I, JOHN J. FRANK, a citizen of the United States, residing at Schenectady, county of Schenectady, State of New York, have invented certain new and useful Improvements in Multiphase Transformers, of which the following is a specification.

My present invention relates to multiphase windings for transformers, reactive coils, or the like, and comprises more especially a novel arrangement of connections for either the high or low voltage windings of a multiphase transformer of any number of phases.

In carrying my invention into practice I provide a plurality of coils for each phase. For one voltage the coils of each phase are in series with each other and are Y or star connected in the usual manner. When it is desired to multiply connect the coils of the respective phases, I accomplish this result not by connecting the coils of the respective phases in multiple, as in the usual single-phase transformers, but by connecting them so as to form a plurality of sets of Y-connected coils. These sets are then placed in multiple with each other so that the neutral points remain entirely separate.

The novel features which are characteristic of the invention I have pointed out with particularity in the appended claims. The invention itself, however, will be better understood by reference to the following description, taken in connection with the accompanying drawings, in which—

Figure 1:
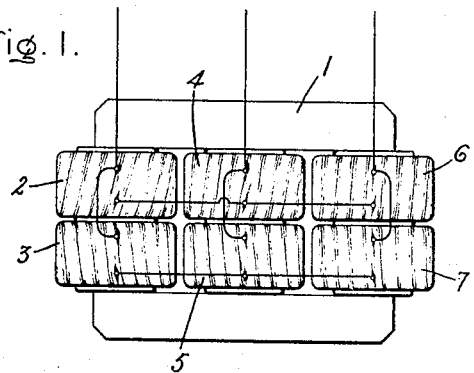
Figure 2:
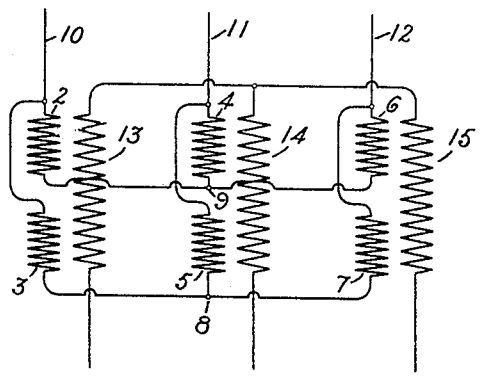
Figure 3:
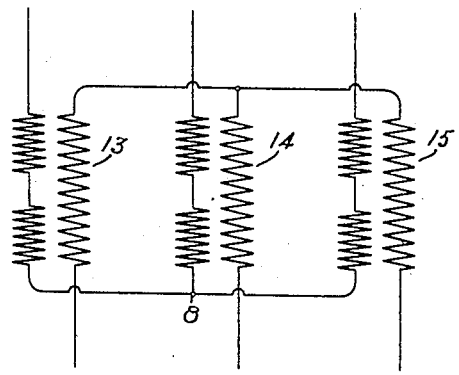

Figure 1 is a representation of a three-phase transformer having its coils connected in accordance with my invention. Fig. 2 is a diagram representing the connections of the windings in Fig. 1, and Fig. 3 is another diagram showing a different connection of the windings.

For purposes of illustration I have in Fig. 1 represented my invention as applied to a three-phase-core type transformer. It is to be understood, however, that this representation is merely by way of illustration and that the invention may be embodied in transformers and similar devices of different construction from that shown and of different numbers of phases.

In Fig. 1 the core of the transformer is indicated at 1 and is provided in a manner common to three-phase transformers with three legs, upon which are mounted the coils corresponding, respectively, to the three phases. In the present instance the high-potential winding for each phase consists of two coils. Those of one phase are indicated at 2 and 3, of the next phase at 4 and 5, and of the third phase at 6 and 7. Coils of the respective phases may be connected in series with each other, as indicated in Fig. 3, in which case the neutral point or junction between the sets of coils is shown at 8. When, however, it is desired to connect the coils in multiple, I arrange the connections as shown in diagram in Fig. 2. These connections are such as to constitute two sets of Y-connected coils. One set consists, for example, of the coils 2, 4, and 6, connected to the common point 9. The other set consists of the coils 3, 5, and 7, connected to the common point 8, corresponding to the point 8 in Fig. 3. These two sets of coils are each connected to the mains 10, 11, and 12, whereby the two sets are in multiple with each other. The individual coils of each phase, however, are not strictly in multiple with each other, since they are connected to separate neutral points. In order that the coils may divide the load properly, they are arranged on the core in any well-known manner, so as to receive equal induction. The corresponding low-potential or secondary windings are indicated at 13, 14, and 15. These windings may be connected either in Y, as shown, or in delta or in any other desired manner. If desired, the individual low-potential windings may be subdivided by taps, so that each secondary constitutes, for example, a supply source for a three-wire system.

It is to be understood that the multiple connection of coils as above described may be applied either to the primary or the secondary windings, or both.

What I claim as new, and desire to secure by Letters Patent of the United States, is—

1. The combination of a three-phase transformer having a plurality of coils for each phase, and connections between the coils such as to form a plurality of multiply-connected sets of Y-connected coils.

2. In a multiphase transformer, the combination of a plurality of coils for each phase, connections joining one terminal of one coil of each phase to a common point, connections joining another coil of each phase to a separate common point, and multiphase leads extending from the remaining terminals of said coils.

3. The combination of multiphase leads, a plurality of inductively-related coils for each phase, connections between a coil of each phase and a neutral point, similar connections between the other coils and a neutral point or points, and connections between each coil of each phase and a corresponding main.

4. In a multiphase apparatus, a plurality of like functionating coils for each phase, and connections between the coils such that the coils corresponding to a given phase are connected to separate neutral points.

In witness whereof I have hereunto set my hand this 4th day of February, 1904.

JOHN J. FRANK.

Witnesses:
BENJAMIN B. HULL,
HELEN ORFORD.